United States Patent
Wang et al.

(10) Patent No.: US 11,206,652 B2
(45) Date of Patent: Dec. 21, 2021

(54) DOWNLINK CHANNEL TRANSMITTING METHOD, DOWNLINK CHANNEL RECEIVING METHOD, DEVICES THEREOF, BASE STATION AND TERMINAL

(71) Applicant: CHINA ACADEMY OF TELECOMMUNICATIONS TECHNOLOGY, Beijing (CN)

(72) Inventors: Lei Wang, Beijing (CN); Tony Ekpenyong, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 102 days.

(21) Appl. No.: 16/610,478

(22) PCT Filed: Apr. 26, 2018

(86) PCT No.: PCT/CN2018/084663
§ 371 (c)(1),
(2) Date: Nov. 1, 2019

(87) PCT Pub. No.: WO2018/201969
PCT Pub. Date: Nov. 8, 2018

(65) Prior Publication Data
US 2020/0163057 A1    May 21, 2020

(30) Foreign Application Priority Data

May 2, 2017  (CN) .......................... 201710301333.1

(51) Int. Cl.
*H04W 72/04* (2009.01)
*H04L 5/00* (2006.01)
(Continued)

(52) U.S. Cl.
CPC ......... *H04W 72/042* (2013.01); *H04L 5/0053* (2013.01); *H04W 48/12* (2013.01); *H04W 72/0446* (2013.01); *H04W 72/1273* (2013.01)

(58) Field of Classification Search
CPC .... G06F 3/0655; G06F 3/0679; G06F 3/0604; G06F 3/0659; G06F 12/0246; G06F 3/061
See application file for complete search history.

(56) References Cited

U.S. PATENT DOCUMENTS

2011/0205992 A1    8/2011   Rudolf et al.
2015/0181574 A1    6/2015   Lee et al.
(Continued)

FOREIGN PATENT DOCUMENTS

CN    102149049 A    8/2011
CN    102694618 A    9/2012
(Continued)

OTHER PUBLICATIONS

International Search Report in the international application No. PCT/CN2018/084663, dated Jun. 13, 2018.
(Continued)

*Primary Examiner* — Dady Chery
(74) *Attorney, Agent, or Firm* — Ladas & Parry, LLP

(57) ABSTRACT

A downlink channel transmitting method, a downlink channel receiving method, devices thereof, a base station and a terminal are provided. The downlink channel transmitting method is applied to a base station and includes: indicating, explicitly or implicitly, a transmitting period of a group common physical downlink control channel.

16 Claims, 5 Drawing Sheets indicating, explicitly or implicitly, a transmitting period of a group common physical downlink control channel — 101

(51) Int. Cl.
*H04W 48/12* (2009.01)
*H04W 72/12* (2009.01)

(56) References Cited

U.S. PATENT DOCUMENTS

| | | | |
|---|---|---|---|
| 2016/0249331 A1 | 8/2016 | Park et al. | |
| 2016/0353420 A1 | 12/2016 | You et al. | |
| 2018/0167169 A1 | 6/2018 | Takeda et al. | |
| 2018/0262311 A1* | 9/2018 | Wang | H04L 5/0055 |

FOREIGN PATENT DOCUMENTS

| | | |
|---|---|---|
| CN | 103037510 A | 4/2013 |
| CN | 103796311 A | 5/2014 |
| EP | 3122116 A1 | 1/2017 |
| GB | 2508595 A | 6/2014 |
| JP | 2015530026 A | 10/2015 |
| JP | 2016507176 A | 3/2016 |
| JP | 2017038321 A | 2/2017 |

OTHER PUBLICATIONS

Written Opinion of the International Search Authority in the international application No. PCT/CN2018/084663, dated Jun. 13, 2018 and English translation provided by Google Translate.
Huawei et al., "Remaining Details on Group-common PDCCH", 3GPP TSG RAN WG 1 Meeting 91, R1-1719388, Nov. 18, 2017.
First Office Action and Search Report from CN app. No. 201710301333.1, dated Mar. 11, 2020, with English translation from Global Dossier.
Extended European Search Report from EP app. No. 18794522.5, dated Apr. 8, 2020.
Written Opinion of the International Searching Authority from PCT/CN2018/084663, dated Jun. 13, 2018, with English translation from WIPO.
International Search Report from PCT/CN2018/084663, dated Jun. 13, 2018, with English translation from WIPO.
International Preliminary Report on Patentability from PCT/CN2018/084663, dated Nov. 5, 2019, with English translation from WIPO.
"NR DL Control Channel Structure", R1-1701585, 3GPP TSG RAN WG1 Meeting #88, Athens, Greece, Feb. 13-17, 2017.
"Dynamic TDD slot structure", R1-1702112, 3GPP TSG RAN WG1 Meeting #88, Athens, Greece, Feb. 13-17, 2017.
"DL Common Control for NR", R1-1704370, 3GPP TSG WG1 Meeting #88bis, Spokane, USA, Apr. 3-7, 2017.
"Content for Group-common PDCCH", R1-1714091, 3GPP TSG-RAN WG1 NR#2, Prague, Czech, Aug. 21-25, 2017.
Notice of Reasons for Refusal from JP app. No. 2019-559781, dated Feb. 2, 2021, with English translation provided by Global Dossier.
Notification of Reason for Refusal from KR app. No. 10-2019-7035279, dated Nov. 5, 2020, with English translation from Global Dossier.

* cited by examiner indicating, explicitly or implicitly, a transmitting period of a group common physical downlink control channel ⟵ 101

FIG. 1 determining, explicitly or implicitly, a transmitting period of a group common physical downlink control channel 〜501

DOWNLINK CHANNEL TRANSMITTING METHOD, DOWNLINK CHANNEL RECEIVING METHOD, DEVICES THEREOF, BASE STATION AND TERMINAL

CROSS-REFERENCE TO RELATED APPLICATIONS

The present applicatibon is the U.S. national phase of PCT Application PCT/CN2018/084663 filed on Apr. 26, 2018, which claims a priority of the Chinese patent application No. 201710301333.1 filed on May 2, 2017, the disclosures of which are incorporated in their entireties by reference herein.

TECHNICAL FIELD

The present disclosure relates to the field of communication technology, and in particular to a downlink channel transmitting method, a downlink channel receiving method, devices thereof, a base station and a terminal.

BACKGROUND

The mobile Internet is subverting the traditional mobile communication business model, providing users with an unprecedented experience, which has a profound impact on all aspects of people's work and life. The further development of the mobile Internet will bring about a thousand times increase in mobile traffic in the future, and promote a new round of changes in mobile communication technologies and industries. The Internet of Things has expanded the range of services for mobile communications, from human-to-human communication to the intelligent interconnection of people and things, things and things, making mobile communication technology penetrate into a wider range of industries and fields. At the same time, massive device connectivity and diverse IoT services will also bring new technical challenges to mobile communications.

As new business requirements continue to emerge and become more demanding, higher performance demands are placed on future mobile communication systems, such as higher peak rates, better user experience rates, smaller latency, and higher reliability. Higher spectral efficiency and higher energy efficiency, and need to support more user access and use various types of services. In order to support a large number of types of terminal connections and different types of services, the flexible configuration of uplink and downlink resources has become a major trend in technology development. The future system resources can be divided into different sub-bands according to different services, and TTIs (Transmission Time Intervals) of different lengths are allocated on the sub-bands to meet various service requirements.

The related LTE FDD system uses a frame structure type 1 (FS1). In the FDD system, the uplink and downlink transmissions use different carrier frequencies, and both the uplink and downlink transmissions use the same frame structure. On each carrier, a 10 ms-length radio frame contains 10 1 ms subframes, each of which is divided into two 0.5 ms long slots. The TTI duration of uplink and downlink data transmission is 1 ms.

The related LTE TDD system uses a frame structure type 2 (FS2). In a TDD system, uplink and downlink transmissions use different subframes or different time slots on the same frequency. Each 10 ms radio frame in FS2 consists of two 5 ms half frames, each of which contains five subframes of 1 ms length. The subframes in FS2 are classified into three types: a downlink subframe, an uplink subframe, and a special subframe, and each subframe includes at least one downlink subframe and at least one uplink subframe, and at most one special subframe.

The PDCCH (physical downlink control channel) of the LTE system is used to carry scheduling information and other control information. There may be multiple PDCCHs in the control region of each downlink subframe, and the size of the control region is determined by a PCFICH (Physical Control Format Indicator Channel). The transmission of one control channel occupies one CCE (control channel element) or multiple consecutive CCEs, and each CCE consists of 9 REGs (resource element groups). The UE monitors the PDCCH candidate set in the non-DRX subframe, that is, attempts to decode each PDCCH in the search space according to the downlink control information format DCI (Downlink Control Information) format to be monitored.

In order to extend the capacity of the PDCCH, an EPDCCH (Enhanced Physical Downlink Control Channel, Enhanced Physical Downlink Control Channel) is introduced in Rel-11. The EPDCCH is transmitted in a data area in a subframe, and cannot occupy the transmission space of the PDCCH. The terminal in which the EPDCCH is configured detects the received EPDCCH in the physical resource block set PRB (Physical Resource Block) set configured in each subframe.

In a related LTE system, the TTI length is fixed to 1 ms, and one or more PDCCHs are transmitted on the first N OFDM symbols of each TTI or a set of physical resource blocks in the data region are transmitted on the PRB pair or in multiple consecutive On the non-contiguous subframe, the UE blindly checks its own PDCCH on the CSS (Common Search Space) or USS (UE Specific Search Space) according to the information obtained. In a future mobile communication system, it is necessary to introduce a group common PDCCH that schedules or notifies a group of terminal related information. However, at present, there is no clear solution for how to transmit or notify the group common PDCCH of a group of terminal related information, and the terminal does not know how to receive the group common PDCCH. This technical issue needs to be solved urgently.

SUMMARY

A downlink channel transmitting method, a downlink channel receiving method, devices thereof, a base station and a terminal are provided in the present disclosure, to solve the technical issue in the related art that there is no clear solution of how to transmit group common PDCCH for scheduling or notifying a group of terminal related information which resulting in that the terminal does not know how to receive the group common PDCCH.

To solve the above technical issues, a downlink channel transmitting method applied to a base station is provided in the embodiment of the present disclosure, including: indicating, explicitly or implicitly, a transmitting period of a group common physical downlink control channel.

Optionally, the indicating implicitly the transmitting period of the group common physical downlink control channel includes: determining, based on a protocol, the transmitting period of the group common physical downlink control channel.

Optionally, the method further includes: determining, based on the protocol, a starting time slot position of transmitting the group common physical downlink control channel.

Optionally, subsequent to the determining, based on the protocol, the starting time slot position of transmitting the group common physical downlink control channel, the method further includes: determining a transmitting time slot, based on the transmitting period and the starting time slot position of the group common physical downlink control channel determined based on the protocol; transmitting the group common physical downlink control channel on the transmitting time slot.

Optionally, the indicating explicitly the transmitting period of the group common physical downlink control channel includes: notifying to all terminals within a coverage range of the base station, through a broadcast signaling, the transmitting period of the group common physical downlink control channel.

Optionally, the method further includes: determining, based on a protocol, a starting time slot position of transmitting the group common physical downlink control channel; or notifying to all the terminals within the coverage range of the base station, through the broadcast signaling, the starting time slot position of transmitting the group common physical downlink control channel.

Optionally, subsequent to the determining, based on the protocol, the starting time slot position of transmitting the group common physical downlink control channel, or notifying to all the terminals within the coverage range of the base station, through the broadcast signaling, the starting time slot position of transmitting the group common physical downlink control channel, the method further includes: determining a transmitting time slot, based on the transmitting period and the starting time slot position of the group common physical downlink control channel; transmitting the group common physical downlink control channel on the transmitting time slot.

Optionally, the indicating explicitly the transmitting period of the group common physical downlink control channel includes: notifying to a terminal, through a high layer signaling, the transmitting period of the group common physical downlink control channel corresponding to the terminal.

Optionally, the method further includes: determining, based on a protocol, a starting time slot position of transmitting the group common physical downlink control channel; or notifying to the terminal, through the high layer signaling, an offset of transmitting the group common physical downlink control channel corresponding to the terminal.

Optionally, subsequent to the determining, based on the protocol, the starting time slot position of transmitting the group common physical downlink control channel, the method further includes: determining a transmitting time slot, based on the transmitting period and the starting time slot position of the group common physical downlink control channel; transmitting the group common physical downlink control channel on the transmitting time slot; or subsequent to the notifying to the terminal, through the high layer signaling, the offset of transmitting the group common physical downlink control channel corresponding to the terminal, the method further includes: determining a transmitting time slot, based on the transmitting period and the offset of the group common physical downlink control channel; transmitting the group common physical downlink control channel on the transmitting time slot.

Optionally, the transmitting the group common physical downlink control channel on the transmitting time slot includes: in the case that a first transmitting time slot is a uplink-only time slot, transmitting the group common physical downlink control channel on a downlink transmitting time slot following and closest to the first transmitting time slot.

A downlink channel transmitting device applied to a base station is further provided in the embodiment of the present disclosure, including: an indicating module, configured to indicate, explicitly or implicitly, a transmitting period of a group common physical downlink control channel.

Optionally, the indicating module includes: a first determining unit, configured to determine, based on a protocol, the transmitting period of the group common physical downlink control channel.

Optionally, the device further includes: a first determining module, configured to determine, based on the protocol, a starting time slot position of transmitting the group common physical downlink control channel.

Optionally, the device further includes: a second determining module, configured to determine, in the case that the starting time slot position of transmitting the group common physical downlink control channel is determined based on the protocol, a transmitting time slot, based on the transmitting period and the starting time slot position of the group common physical downlink control channel determined based on the protocol; a transmitting module, configured to transmit the group common physical downlink control channel on the transmitting time slot.

Optionally, the indicating module includes: a first notifying unit, configured to notify to all terminals within a coverage range of the base station, through a broadcast signaling, the transmitting period of the group common physical downlink control channel.

Optionally, the device further includes: a first determining module, configured to determine, based on a protocol, a starting time slot position of transmitting the group common physical downlink control channel; or a first notifying module, configured to notify to all the terminals within the coverage range of the base station, through the broadcast signaling, the starting time slot position of transmitting the group common physical downlink control channel.

Optionally, the device further includes: a third determining module, configured to determine, in the case that the starting time slot position of transmitting the group common physical downlink control channel is determined based on the protocol, or the starting time slot position of transmitting the group common physical downlink control channel is notified to all the terminals within the coverage range of the base station through the broadcast signaling, a transmitting time slot, based on the transmitting period and the starting time slot position of the group common physical downlink control channel;

a transmitting module, configured to transmit the group common physical downlink control channel on the transmitting time slot.

Optionally, the indicating module includes: a second notifying unit, configured to notify to a terminal, through a high layer signaling, the transmitting period of the group common physical downlink control channel corresponding to the terminal.

Optionally, the device further includes: a first determining module, configured to determine, based on a protocol, a starting time slot position of transmitting the group common physical downlink control channel; or a second notifying module, configured to notify to the terminal, through the high layer signaling, an offset of transmitting the group common physical downlink control channel corresponding to the terminal.

Optionally, the device further includes: a fourth determining module, configured to determine, in the case that the starting time slot position of transmitting the group common physical downlink control channel is determined based on the protocol, a transmitting time slot, based on the transmitting period and the starting time slot position of the group common physical downlink control channel, or configured to determine, in the case that the offset of transmitting the group common physical downlink control channel corresponding to the terminal is notified to the terminal through the high layer signaling, a transmitting time slot, based on the transmitting period and the offset of the group common physical downlink control channel; a transmitting module, configured to transmit the group common physical downlink control channel on the transmitting time slot.

Optionally, the transmitting module includes: a transmitting unit, configured to transmit, in the case that a first transmitting time slot is a uplink-only time slot, the group common physical downlink control channel on a downlink transmitting time slot following and closest to the first transmitting time slot.

A base station is further provided in the embodiment of the present disclosure, including: a first memory, a first processor and a computer program stored in the first memory and executable by the first processor, where the first processor executes the computer program to perform the downlink channel transmitting method hereinabove.

A downlink channel receiving method applied to a terminal is further provided in the embodiment of the present disclosure, including: determining, explicitly or implicitly, a transmitting period of a group common physical downlink control channel.

Optionally, the determining implicitly the transmitting period of the group common physical downlink control channel includes: determining, based on a protocol, the transmitting period of the group common physical downlink control channel.

Optionally, the method further includes: determining, based on the protocol, a starting time slot position of transmitting the group common physical downlink control channel.

Optionally, subsequent to the determining, based on the protocol, the starting time slot position of transmitting the group common physical downlink control channel, the method further includes: determining a receiving time slot of the group common physical downlink control channel, based on the transmitting period and the starting time slot position of the group common physical downlink control channel determined based on the protocol;

detecting and receiving the group common physical downlink control channel on the receiving time slot.

Optionally, the determining explicitly the transmitting period of the group common physical downlink control channel includes: determining, based on a broadcast signaling sent by a base station, a transmitting period of the group common physical downlink control channel.

Optionally, the method further includes: determining, based on a protocol, a starting time slot position of transmitting the group common physical downlink control channel; or determining, based on the broadcast signaling sent by the base station, a starting time slot position of transmitting the group common physical downlink control channel.

Optionally, subsequent to the determining, based on the protocol, the starting time slot position of transmitting the group common physical downlink control channel or determining, based on the broadcast signaling sent by the base station, the starting time slot position of transmitting the group common physical downlink control channel, the method further includes: determining a receiving time slot of the group common physical downlink control channel, based on the transmitting period and the starting time slot position of the group common physical downlink control channel; detecting and receiving the group common physical downlink control channel on the receiving time slot.

Optionally, the determining explicitly the transmitting period of the group common physical downlink control channel includes: determining, based on a high layer signaling sent by the base station, the transmitting period of the group common physical downlink control channel.

Optionally, the method further includes: determining, based on a protocol, a starting time slot position of transmitting the group common physical downlink control channel; or determining, based on the high layer signaling sent by the base station, an offset of transmitting the group common physical downlink control channel.

Optionally, subsequent to the determining, based on the protocol, the starting time slot position of transmitting the group common physical downlink control channel, the method further includes: determining a receiving time slot of the group common physical downlink control channel, based on the transmitting period and the starting time slot position of the group common physical downlink control channel; detecting and receiving the group common physical downlink control channel on the receiving time slot; or subsequent to the determining, based on the high layer signaling sent by the base station, the offset of transmitting the group common physical downlink control channel, the method further includes: determining a receiving time slot of the group common physical downlink control channel, based on the transmitting period and the offset of the group common physical downlink control channel; detecting and receiving the group common physical downlink control channel on the receiving time slot.

Optionally, the detecting and receiving the group common physical downlink control channel on the receiving time slot includes: in the case that a first receiving time slot is a uplink-only time slot, detecting and receiving the group common physical downlink control channel on a downlink receiving time slot following and closest to the first receiving time slot.

Optionally, subsequent to the determining the transmitting period of the group common physical downlink control channel, the method further includes: determining, based on the transmitting period of the group common physical downlink control channel, a data valid time of the group common physical downlink control channel.

Optionally, the determining, based on the transmitting period of the group common physical downlink control channel, the data valid time of the group common physical downlink control channel includes: determining the duration of one transmitting period from a time slot where a first group common physical downlink control channel is received as the data valid time of the first group common physical downlink control channel; or determining the duration from a time slot where a first group common physical downlink control channel is received to a time point of receiving a second group common physical downlink control channel as the data valid time of the first group common physical downlink control channel; or determining the duration from a time slot where a first group common physical downlink control channel is received to a time point of receiving an instruction of changing the group common physical downlink control channel sent by the base station as the data valid time of the first group common physical downlink control channel.

A downlink channel receiving device applied to a terminal is provided in the embodiment of the present disclosure, including: a fifth determining module, configured to determine, explicitly or implicitly, a transmitting period of a group common physical downlink control channel.

Optionally, the fifth determining module includes: a second determining unit, configured to determine, based on a protocol, the transmitting period of the group common physical downlink control channel.

Optionally, the device further includes: a sixth determining module, configured to determine, based on the protocol, a starting time slot position of transmitting the group common physical downlink control channel.

Optionally, the device further includes: a seventh determining module, configured to determine, in the case that the starting time slot position of transmitting the group common physical downlink control channel is determined based on the protocol, a receiving time slot of the group common physical downlink control channel, based on the transmitting period and the starting time slot position of the group common physical downlink control channel determined based on the protocol; a receiving module, configured to detect and receive the group common physical downlink control channel on the receiving time slot.

Optionally, the fifth determining module includes: a third determining unit, configured to determine, based on a broadcast signaling sent by a base station, a transmitting period of the group common physical downlink control channel.

Optionally, the device further includes: a six determining unit, configured to determine, based on a protocol, a starting time slot position of transmitting the group common physical downlink control channel; or an eighth determining unit, configured to determine, based on the broadcast signaling sent by the base station, a starting time slot position of transmitting the group common physical downlink control channel.

Optionally, the device further includes: a ninth determining unit, configured to determine, in the case that the starting time slot position of transmitting the group common physical downlink control channel is determined based on the protocol, or the starting time slot position of transmitting the group common physical downlink control channel is determined based on the broadcast signaling sent by the base station, a receiving time slot of the group common physical downlink control channel, based on the transmitting period and the starting time slot position of the group common physical downlink control channel; a receiving module, configured to detect and receive the group common physical downlink control channel on the receiving time slot.

Optionally, the fifth determining module includes: a fourth determining unit, configured to determine, based on a high layer signaling sent by the base station, the transmitting period of the group common physical downlink control channel.

Optionally, the device further includes: a sixth determining unit, configured to determine, based on a protocol, a starting time slot position of transmitting the group common physical downlink control channel; or a tenth determining unit, configured to determine, based on the high layer signaling sent by the base station, an offset of transmitting the group common physical downlink control channel.

Optionally, the device further includes: an eleventh determining module, configured to determine, in the case that the starting time slot position of transmitting the group common physical downlink control channel is determined based on the protocol, a receiving time slot of the group common physical downlink control channel, based on the transmitting period and the starting time slot position of the group common physical downlink control channel, or determine, in the case that the offset of transmitting the group common physical downlink control channel is determined based on the high layer signaling sent by the base station, a receiving time slot of the group common physical downlink control channel, based on the transmitting period and the offset of the group common physical downlink control channel; a receiving module, configured to detect and receive the group common physical downlink control channel on the receiving time slot.

Optionally, the receiving module includes: a receiving unit, configured to detect and receive, in the case that a first receiving time slot is a uplink-only time slot, subsequent to the first receiving time slot, the group common physical downlink control channel on a downlink receiving time slot following and closest to the first receiving time slot.

Optionally, the device further includes: a twelfth determining module, configured to determine, in the case that the transmitting period of the group common physical downlink control channel is determined, a data valid time of the group common physical downlink control channel based on the transmitting period of the group common physical downlink control channel.

Optionally, the twelfth determining module is configured to: determine the duration of one transmitting period from a time slot where a first group common physical downlink control channel is received as the data valid time of the first group common physical downlink control channel; or determine the duration from a time slot where a first group common physical downlink control channel is received to a time point of receiving a second group common physical downlink control channel as the data valid time of the first group common physical downlink control channel; or determine the duration from a time slot where a first group common physical downlink control channel is received to a time point of receiving an instruction of changing the group common physical downlink control channel sent by the base station as the data valid time of the first group common physical downlink control channel.

A terminal is provided in the embodiment of the present disclosure, including: a second memory, a second processor and a computer program stored in the second memory and executable by the second processor, where the second processor executes the computer program to perform the downlink channel receiving method hereinabove.

A non-transitory computer-readable storage medium is provided in the embodiment of the present disclosure, including: programs and instructions stored in the non-transitory computer-readable memory, where a computer processor executes the programs and instructions to perform the downlink channel transmitting method hereinabove.

A non-transitory computer-readable storage medium, including: programs and instructions stored in the non-transitory computer-readable memory, where a computer processor executes the programs and instructions to perform the downlink channel receiving method hereinabove.

According to the downlink channel transmitting method in the embodiment of the present disclosure, a transmitting period of a group common physical downlink control channel is indicated explicitly or implicitly, so that the terminal is able to determine the transmitting period of the group common physical downlink control channel explicitly or implicitly, so as to receive the group common PDCCH sent by the base station effectively, thereby improving the network performance and solving the technical issue in the related art that there is no clear solution of how to transmit group common PDCCH for scheduling or notifying a group of terminal related information which resulting in that the terminal does not know how to receive the group common PDCCH.

BRIEF DESCRIPTION OF THE DRAWINGS

FIG. 1 is a flowchart of a downlink channel transmitting method in the present disclosure;

DETAILED DESCRIPTION

Figure 2:
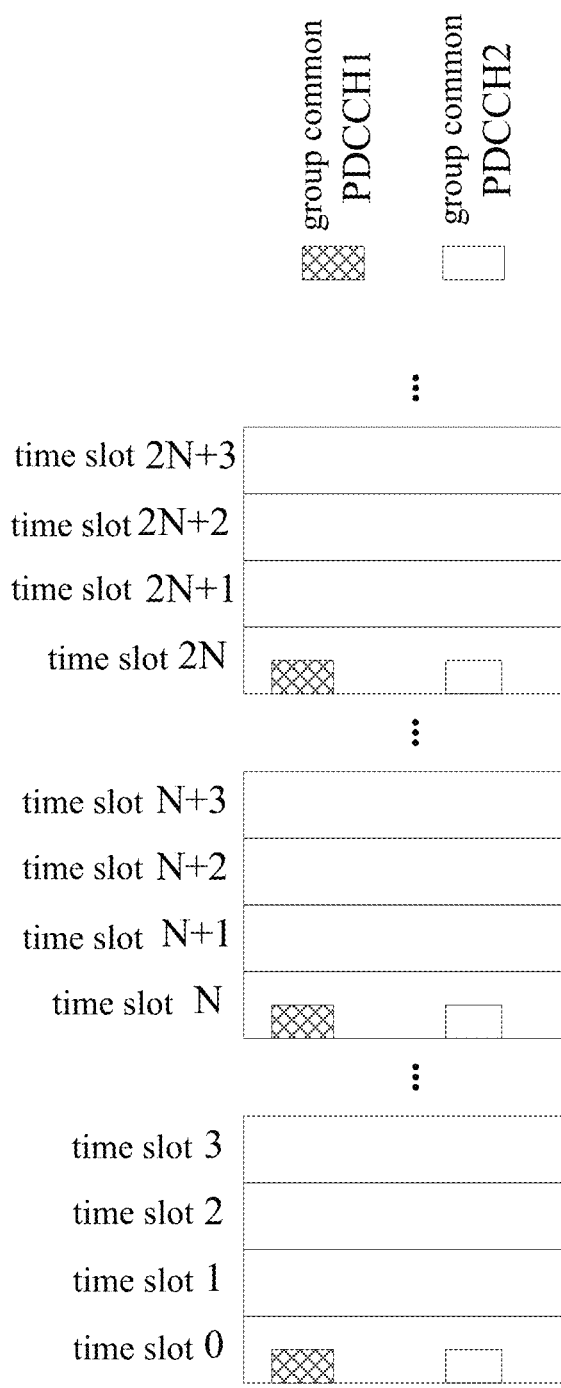
FIG. 2 is a schematic view of a transmitting period of a group common PDCCH in the present disclosure.

In order that the technical problems to be solved by the present disclosure as well as the technical solutions and advantages will become clearer, the present disclosure will be described in detail below in conjunction with the accompanying drawings and specific embodiments.

In some embodiments of the present disclosure, as shown in FIG. 1, a downlink channel transmitting method applied to a base station is provided, including: Step 101: indicating, explicitly or implicitly, a transmitting period of a group common physical downlink control channel.

Here, the group common PDCCH is a PDCCH valid for a group of terminals, and only a specific UE can receive the group common PDCCH.

According to the downlink channel transmitting method in the embodiment of the present disclosure, a transmitting period of a group common physical downlink control channel is indicated explicitly or implicitly, so that the terminal is able to determine the transmitting period of the group common physical downlink control channel explicitly or implicitly, so as to receive the group common PDCCH sent by the base station effectively, thereby improving the network performance and solving the technical issue in the related art that there is no clear solution of how to transmit group common PDCCH for scheduling or notifying a group of terminal related information which resulting in that the terminal does not know how to receive the group common PDCCH.

Optionally, the foregoing Step 101 includes: Step 1011: determining, based on a protocol, the transmitting period of the group common physical downlink control channel.

Here, the base station may determine a transmitting period of the group common physical downlink control channel based on a protocol. At this time, the transmitting period of the group common PDCCH is predefined in the protocol, and is fixed, that is, the base station transmits the group common PDCCH with a fixed transmitting period to all terminals, and all terminals receive their corresponding group common PDCCH according to the fixed transmitting period.

One transmitting period is the duration between two time points of transmitting two adjacent group common PDCCHs by the base station respectively, for example, there are N time slots, and N is a positive integer greater than or equal to 1.

Further, in order to accurately determine the transmitting time slot, the method further includes: Step 1012: determining, based on the protocol, a starting time slot position of transmitting the group common physical downlink control channel.

Here, the base station may determine, based on the protocol, a starting time slot position of transmitting the group common PDCCH, and further determine a transmitting time slot of the group common PDCCH based on the transmitting period. At this time, the starting time slot position of transmitting the group common PDCCH is predefined in the protocol, and is fixed. That is, the base station begins to transmit the group common PDCCH at a fixed starting time slot position for all terminals, and all terminals begin to receive the group common PDCCH at the fixed starting time slot position.

Optionally, after Step 1012, the method further includes: determining a transmitting time slot, based on the transmitting period and the starting time slot position of the group common physical downlink control channel determined based on the protocol; transmitting the group common physical downlink control channel on the transmitting time slot.

At this time, the base station may accurately determine the transmitting time slots of the group common PDCCH according to the fixed transmitting period and the fixed starting time slot position of the group common PDCCH determined based on the protocol, and then transmit the group common PDCCH on the transmitting time slots. The terminal may accurately determine the receiving time slots of the group common PDCCH according to the fixed transmitting period and the fixed starting time slot position of the group common PDCCH determined based on the protocol, and then detect and receive the group common PDCCH on the receiving time slots.

For example, in the case that the transmitting period of the group common PDCCH is N, N is a positive integer greater than or equal to 1, and the slot number of the starting time slot position of transmitting the group common PDCCH is S, then the slot numbers of the transmitting time slots of the group common PDCCH may be determined as S, S+N, S+2N, S+3N . . . in order.

Further, the transmitting the group common physical downlink control channel on the transmitting time slot includes: in the case that a first transmitting time slot is a uplink-only time slot, transmitting the group common physical downlink control channel on a downlink transmitting time slot following and closest to the first transmitting time slot.

At this time, in the case that the transmitting time slot where the base station transmits the group common PDCCH is a uplink-only time slot, the base station transmits the group common PDCCH on a downlink transmitting time slot following and closest to the first transmitting time slot, thereby ensuring the smooth transmission of the group common PDCCH.

According to the embodiment of the present disclosure, the base station may transmit the group common PDCCH according to the fixed transmitting period determined based on the protocol, and the terminal may effectively receive the group common PDCCH according to the fixed transmitting period determined based on the protocol, thereby improving the network performance.

Optionally, Step 101 includes: Step 1013: notifying to all terminals within a coverage range of the base station, through a broadcast signaling, the transmitting period of the group common physical downlink control channel.

Here, the base station notifies to all terminals, through the broadcast signaling, the transmitting period of transmitting the group common PDCCH, that is, the base station transmits the group common PDCCH to all the terminals according to the transmitting period notified by the broadcast signaling, and all the terminals receive their corresponding group common PDCCH according to the transmitting period notified by the broadcast signaling.

The broadcast signaling may be system information such as an MIB (Master Information Block) and/or an SIB (System Information Block).

The base station may adjust the transmitting period of transmitting the group common PDCCH according to actual service requirements or deployment scenarios.

One transmitting period is the duration between two time points of transmitting two adjacent group common PDCCHs by the base station respectively, for example, there are N time slots, and N is a positive integer greater than or equal to 1.

Further, in order to accurately determine the transmitting time slot, the base station notifies to all terminals, through the broadcast signaling, the transmitting period of transmitting the group common PDCCH, and the base station may also determine the starting time slot position of transmitting the group common PDCCH based on the protocol or notify the starting time slot position of transmitting the group common PDCCH through a broadcast signaling. The details are described below.

Optionally, the method further includes Step 1014 and/or Step 1015.

Step 1014: determining, based on the protocol, a starting time slot position of transmitting the group common physical downlink control channel.

Here, the base station may determine, based on the protocol, a starting time slot position of transmitting the group common PDCCH, and further determine a transmitting time slot of the group common PDCCH based on the transmitting period. At this time, the starting time slot position of transmitting the group common PDCCH is predefined in the protocol, and is fixed. That is, the base station begins to transmit the group common PDCCH at a fixed starting time slot position for all terminals, and all terminals begin to receive the group common PDCCH at the fixed starting time slot position.

Step 1015: notifying to all the terminals within the coverage range of the base station, through the broadcast signaling, the starting time slot position of transmitting the group common physical downlink control channel.

Here, the base station notifies to all the terminals, through a broadcast signaling, the starting time slot position of transmitting the group common PDCCH, and then the base station may determine the transmitting time slot of the group common PDCCH based on the starting time slot position and the transmitting period. At this time, the base station begins to transmit the group common PDCCH at the starting time slot position notified through the broadcast signaling for all terminals, and all the terminals begin to receive the corresponding group common PDCCH at the starting time slot position notified through the broadcast signaling.

Optionally, after Step 1014, the method further includes: determining a transmitting time slot, based on the transmitting period and the starting time slot position of the group common physical downlink control channel; transmitting the group common physical downlink control channel on the transmitting time slot.

At this time, the base station may accurately determine the transmitting time slots of the group common PDCCH based on the transmitting period of the group common PDCCH notified through the broadcast signaling and based on the fixed starting time slot position of the group common PDCCH determined based on the protocol, and then transmit the group common PDCCH on the transmitting time slots. The terminal may accurately determine the receiving time slots of the group common PDCCH based on the transmitting period of the group common PDCCH notified through the broadcast signaling and based on the fixed starting time slot position of the group common PDCCH determined based on the protocol, and then detect and receive the group common PDCCH on the receiving time slots.

For example, in the case that the transmitting period of the group common PDCCH is N, N is a positive integer greater than or equal to 1, and the slot number of the starting time slot position of transmitting the group common PDCCH is S, then the slot numbers of the transmitting time slots of the group common PDCCH may be determined as S, S+N, S+2N, S+3N . . . in order.

After the Step 1015, the method further includes: determining a transmitting time slot, based on the transmitting period and the starting time slot position of the group common physical downlink control channel; transmitting the group common physical downlink control channel on the transmitting time slot.

At this time, the base station may accurately determine the transmitting time slots of the group common PDCCH based on the transmitting period and the starting time slot position of the group common PDCCH notified through the broadcast signaling, and then transmit the group common PDCCH on the transmitting time slots. The terminal may accurately determine the receiving time slots of the group common PDCCH based on the transmitting period and the starting time slot position of the group common PDCCH notified through the broadcast signaling, and then detect and receive the group common PDCCH on the receiving time slots.

For example, in the case that the transmitting period of the group common PDCCH is N, N is a positive integer greater than or equal to 1, and the slot number of the starting time slot position of transmitting the group common PDCCH is C, then the slot numbers of the transmitting time slots of the group common PDCCH may be determined as C, C+N, C+2N, C+3N . . . in order.

Further, the transmitting the group common physical downlink control channel on the transmitting time slot includes: in the case that a first transmitting time slot is a uplink-only time slot, transmitting the group common physical downlink control channel on a downlink transmitting time slot following and closest to the first transmitting time slot.

At this time, in the case that the transmitting time slot where the base station transmits the group common PDCCH is a uplink-only time slot, the base station transmits the group common PDCCH on a downlink transmitting time slot following and closest to the first transmitting time slot, thereby ensuring the smooth transmission of the group common PDCCH.

According to the embodiment of the present disclosure, the base station may notify to all terminals, through the broadcast signaling, the transmitting period of transmitting the group common PDCCH, and the terminals may receive effectively the group common PDCCH according to the transmitting period notified through the broadcast signaling, thereby improving the network performance.

Optionally, the foregoing Step 101 includes: Step 1016: notifying to a corresponding terminal, through a high layer signaling, the transmitting period of the group common physical downlink control channel corresponding to the terminal.

Here, the high layer signaling is high layer signaling for each terminal, that is, contents of the high layer signaling of different terminals may be different. The base station sends the corresponding transmitting period of the group common PDCCH to each terminal through the high layer signaling, and the group common PDCCH transmitting periods of different terminals may be different.

The high layer signaling may be a RRC signaling.

At this time, the base station sends the corresponding transmitting period of the group common PDCCH to each terminal through the high layer signaling, and the terminal receives the corresponding group common PDCCH according to transmitting period of the group common PDCCH notified through the high layer signaling.

One transmitting period is the duration between two time points of transmitting two adjacent group common PDCCHs by the base station respectively, for example, there are N time slots, and N is a positive integer greater than or equal to 1.

Further, in order to accurately determine the transmitting time slot, the base station notifies to all terminals, through the high layer signaling, the transmitting period of transmitting the group common PDCCH, and the base station may also determine the starting time slot position of transmitting the group common PDCCH based on the protocol or notify the starting time slot position of transmitting the group common PDCCH through the high layer signaling. The details are described below.

Optionally, the method further includes Step 1017 and/or Step 1018.

Step 1017: determining, based on a protocol, a starting time slot position of transmitting the group common physical downlink control channel.

Here, the base station may determine, based on the protocol, a starting time slot position of transmitting the group common PDCCH, and further determine a transmitting time slot of the group common PDCCH based on the transmitting period. At this time, the starting time slot position of transmitting the group common PDCCH is predefined in the protocol, and is fixed. That is, the base station begins to transmit the group common PDCCH at a fixed starting time slot position for all terminals, and all terminals begin to receive the group common PDCCH at the fixed starting time slot position.

Step 1018: notifying to a terminal, through the high layer signaling, an offset of transmitting the group common physical downlink control channel corresponding to the terminal.

Here, the base station notifies to each terminals, through a high layer signaling, the starting time slot position of transmitting the group common PDCCH, and then the base station may determine the transmitting time slot of the group common PDCCH based on the starting time slot position and the transmitting period. At this time, the base station begins to transmit, to each terminal, the group common PDCCH at the starting time slot position corresponding to each terminal, and then each the terminal begins to receive the corresponding group common PDCCH at the starting time slot position notified through the high layer signaling.

The offset value of the group common PDCCH corresponding to the terminal is less than or equal to the corresponding transmitting period.

Optionally, after step 1017, the method further includes: determining a transmitting time slot, based on the transmitting period and the starting time slot position of the group common physical downlink control channel; transmitting the group common physical downlink control channel on the transmitting time slot.

At this time, the base station may accurately determine the transmitting time slot of the group common PDCCH of each terminal based on the transmitting period of the group common PDCCH of each terminal and based on the fixed starting time slot position of the group common PDCCH determined based on the protocol, and then transmit the group common PDCCH on the transmitting time slot. The terminal may accurately determine the receiving time slot of the group common PDCCH based on the transmitting period of the group common PDCCH notified through the high layer signaling and based on the fixed starting time slot position of the group common PDCCH determined based on the protocol, and then detect and receive the group common PDCCH on the receiving time slot.

For example, in the case that the slot number of the starting time slot position of transmitting the group common PDCCH by the base station is S, the base station notifies to the UE1, through the high layer signaling, that the transmitting period of the group common PDCCH is N1 slots, and notifies to the UE2, through the high layer signaling, that the transmitting period of the group common PDCCH is N2 slots, where N1 and N2 are positive integers greater than or equal to 1, then it may be determined that the slot numbers of the transmitting time slots of the group common PDCCH of UE1 is S+N1, S+2N1, S+3N1 . . . , and the slot numbers of the transmitting time slots of the group common PDCCH is S+N2, S+2N2, S+3N2 . . . .

Optionally, after Step 1018, the method further includes: determining a transmitting time slot, based on the transmitting period and the offset of the group common physical downlink control channel; transmitting the group common physical downlink control channel on the transmitting time slot.

At this time, the base station may accurately determine the transmitting time slot of the group common PDCCH of each terminal based on the transmitting period and offset of the group common PDCCH of each terminal, and then transmit the group common PDCCH on the transmitting time slot. The terminal may accurately determine the receiving time slot of the group common PDCCH based on the transmitting period and the offset of the group common PDCCH notified through the high layer signaling, and then detect and receive the group common PDCCH on the receiving time slot.

For example, in the case that the base station notifies to the UE1, through the RRC signaling, that the offset of transmitting the group common PDCCH is S1, and the transmitting period is N1, where S1 is less than or equal to N1; the base station notifies to the UE2, through the RRC signaling, that the offset of transmitting the group common PDCCH is S2, and the transmitting period is N2, where S2 is less than or equal to N2; both N1 and N2 are positive integers greater than or equal to 1. Then, it may be determined that the slot numbers of the transmitting time slots of the group common PDCCH of the UE1 are slot S1+N1, S1+2N1, S1+3N1, . . . , and the slot numbers of the transmitting time slots of the group common PDCCH of the UE2 is slot S2+N2, S2+2N2, S2+3N2 . . . .

Further, the transmitting the group common physical downlink control channel on the transmitting time slot includes: in the case that a first transmitting time slot is a uplink-only time slot, transmitting the group common physical downlink control channel on a downlink transmitting time slot following and closest to the first transmitting time slot.

At this time, in the case that the transmitting time slot where the base station transmits the group common PDCCH is a uplink-only time slot, the base station transmits the group common PDCCH on a downlink transmitting time slot following and closest to the first transmitting time slot, thereby ensuring the smooth transmission of the group common PDCCH.

According to the embodiment of the present disclosure, the base station may notify to each terminal, through the high layer signaling, the transmitting period of transmitting the group common PDCCH, and the terminal may receive effectively the group common PDCCH according to the transmitting period notified through the high layer signaling, thereby improving the network performance.

In the embodiment of the present disclosure, the terminal may detect and receive the group common PDCCH according to the transmitting period of the group common PDCCH, and then the terminal may accurately determine the data valid time of the group common PDCCH according to the transmitting period of the group common PDCCH.

For example, the terminal may determine a duration of one transmitting period from a time slot where a first group common physical downlink control channel is received as the data valid time of the first group common physical downlink control channel; or the terminal may determine a duration from a time slot where a first group common physical downlink control channel is received to a time point of receiving a second group common physical downlink control channel as the data valid time of the first group common physical downlink control channel; or the terminal may determine a duration from a time slot where a first group common physical downlink control channel is received to a time point of receiving an instruction of changing the group common physical downlink control channel sent by the base station as the data valid time of the first group common physical downlink control channel.

An example of a specific application flow of the embodiment of the present disclosure is as follows:

It is assumed that the base station configures, through the high layer signaling, the group common PDCCH that the terminal is to detect and receive. For example, the UE1, UE2, and the UE3 are to detect and receive the group common PDCCH 1, and the terminal UE4 and the UE5 are to detect and receive the group common PDCCH 2. It is assumed that the base station determines, based on the protocol, that the group common PDCCH is to be transmitted at slot S, slot S+N, slot S+2N, . . . , and then the terminal may determine, based on protocol, to detect and receive the corresponding group common PDCCH at slot S, slot S+N, slot S+2N . . . . For example, if S=0, the terminal needs to detect and receive the group common PDCCH at slots 0, slot N, slot 2N, slot 3N, and so on. As shown in FIG. 2, the UE1, UE2 and UE3 need to detect and receive their corresponding group common PDCCH 1 at slots 0, slot N, slot 2N, etc.; the UE4 and UE5 need to detect and receive their corresponding group common PDCCH 2 at slot 0, slot N, slot 2N, etc.

After receiving the group common PDCCH, the terminal may transmit, until the next receiving slot of the group common PDCCH, the received data according to the received group common PDCCH; or, after receiving the group common PDCCH, the terminal may transmit, until the next time receiving the group common PDCCH successfully, the received data according to the group common PDCCH received successfully; or, after receiving the group common PDCCH, the terminal may transmit, until the base station notifies to change the related parameters, the received data according to the group common PDCCH received successfully.

Figure 3:
FIG. 3 is another schematic view of a transmitting period of a group common PDCCH in the present disclosure.

Further, in the case that the slot where to transmit the group common PDCCH is an uplink-only slot, the base station may transmit the group common PDCCH on the first downlink slot subsequent to the slot. The terminal learns that the slot where the transmission position of the group common PDCCH is uplink-only, and the terminal may detect and receive the group common PDCCH at the first downlink slot subsequent to the slot. For example, the base station notifies the terminal that the slot N is a uplink-only slot, and the base station may not transmit the group common PDCCH at the slot N, and the terminal may not detect the receive group common PDCCH at the slot N. Assuming that the closest slot containing the downlink resource after slot N is slot N+2, the base station may transmit the group common PDCCH at slot N+2, and the terminal may detect the receive group common PDCCH at slot N+2, as shown in FIG. 3.

Another specific application flow of the embodiment of the present disclosure is described as follows:

It is assumed that the base station configures, through the high layer signaling, the group common PDCCH that the terminal is to detect and receive. For example, the UE1, UE2, and the UE3 are to detect and receive the group common PDCCH 1, and the terminal UE4 and the UE5 are to detect and receive the group common PDCCH 2. The base station notifies to the terminal, through the broadcast signaling, the transmitting positon of the group common PDCCH. It is assumed that the base station notifies, through MIB and/or SIB, that the group common PDCCH is to be transmitted at slot S, slot S+N, slot S+2N, . . . , and then the terminal may determine, through the MIB and/or SIB, to detect and receive the corresponding group common PDCCH at slot S, slot S+N, slot S+2N . . . . For example, if S=0, the terminal needs to detect and receive the group common PDCCH at slots 0, slot N, slot 2N, slot 3N, and so on. As shown in FIG. 2, the UE1, UE2 and UE3 need to detect and receive their corresponding group common PDCCH 1 at slots 0, slot N, slot 2N, etc.; the UE4 and UE5 need to detect and receive their corresponding group common PDCCH 2 at slot 0, slot N, slot 2N, etc.

After receiving the group common PDCCH, the terminal may transmit, until the next receiving slot of the group common PDCCH, the received data according to the received group common PDCCH; or, after receiving the group common PDCCH, the terminal may transmit, until the next time receiving the group common PDCCH successfully, the received data according to the group common PDCCH received successfully; or, after receiving the group common PDCCH, the terminal may transmit, until the base station notifies to change the related parameters, the received data according to the group common PDCCH received successfully.

Alternatively, the starting offset position S of the group common PDCCH is a predefined value in the protocol, and then the base station only needs to notify the terminal, through broadcast signaling, to detect and receive the transmitting period N of the group common PDCCH.

The base station may adjust the transmitting period of the group common PDCCH through broadcast signaling according to the service status. For example, the base station notifies to the terminal, through the broadcast signaling, that the transmitting period of the group common PDCCH is adjusted from N to 2N.

Further, in the case that the slot where to transmit the group common PDCCH is an uplink-only slot, the base station may transmit the group common PDCCH on the first downlink slot subsequent to the slot. The terminal learns that the slot where the transmission position of the group common PDCCH is uplink-only, and the terminal may detect and receive the group common PDCCH at the first downlink slot subsequent to the slot. For example, the base station notifies the terminal that the slot N is a uplink-only slot, and the base station may not transmit the group common PDCCH at the slot N, and the terminal may not detect the receive group common PDCCH at the slot N. Assuming that the closest slot containing the downlink resource after slot N is slot N+2, the base station may transmit the group common PDCCH at slot N+2, and the terminal may detect the receive group common PDCCH at slot N+2, as shown in FIG. 3.

Another specific application flow of the embodiment of the present disclosure is exemplified as follows:

It is assumed that the base station configures, through the high layer signaling, the group common PDCCH that the terminal is to detect and receive. For example, the UE1, UE2, and the UE3 are to detect and receive the group common PDCCH 1, and the terminal UE4 and the UE5 are to detect and receive the group common PDCCH 2. The base station notifies to the terminal, through the high layer signaling, the transmitting positon of the group common PDCCH. The step of the base station notifying to the terminal, through the high layer signaling, the transmitting positon of the group common PDCCH may include:

The starting time slot position where the base station transmits the group common PDCCH is a predefined position in the protocol, for example, the starting time slot position is slot S. The base station notifies to the terminal, through the high layer signaling, the transmitting period of the group common PDCCH corresponding to the terminal, for example, the transmitting period of the group common PDCCH 1 is N1, and the transmitting period of the group common PDCCH 2 is N2. Then, the UE1, UE2 and UE3 learn that the slots of the group common PDCCH 1 that they need to receive are slot S, slot S+N1, slot S+2N1, slot S+3N1, . . . then the terminals may try to detect the receive the group common PDCCH 1 at slot S+N1, slot S+2N1 and slot S+3N1. The terminals UE4 and UE5 learn that the slots of the group common PDCCH 2 they need to receive are slot S, slot S+N2, slot S+2N2, slot S+3N2 . . . , then the terminal may try to detect and receive the group common PDCCH 2 at slot S+N2, slot S+2N2, slot S+3N2.

Figures 4, 5:
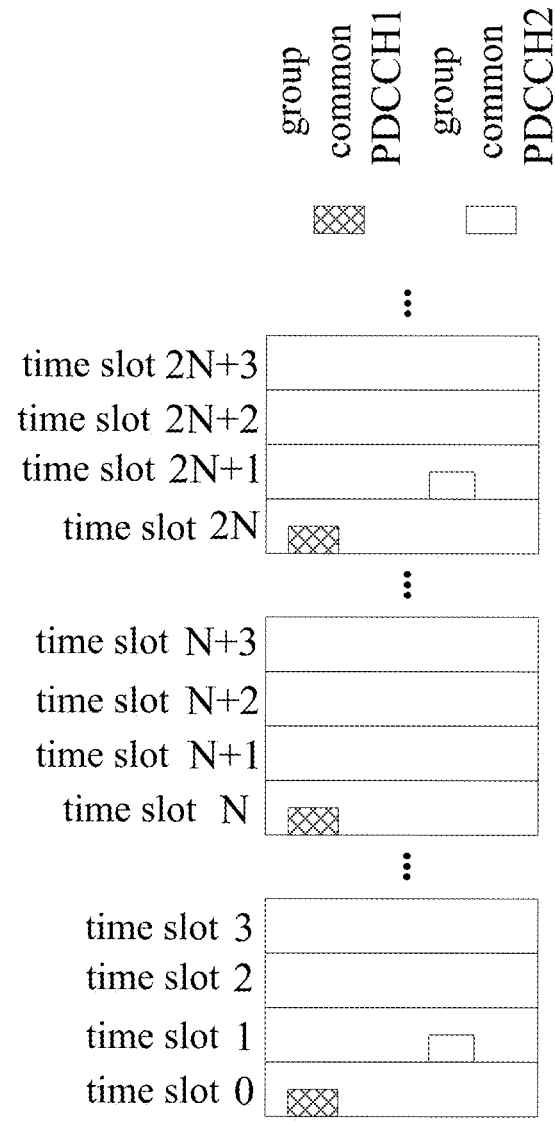
FIG. 4 is another schematic view of a transmitting period of a group common PDCCH in the present disclosure.
FIG. 5 is a flowchart of a downlink channel receiving method in the present disclosure.

Alternatively, the base station notifies to the terminal, through the high layer signaling, the offset and transmitting period of the group common PDCCH transmission corresponding to the terminal. For example, the base station configures to the UE1, UE2 and UE3, through the RRC signaling, that the offset of transmitting the group common PDCCH 1 is S1 slots, and the transmitting period is N1, where S1 is less than or equal to N1; the base station configures to the UE4 and UE5, through the RRC signaling, that the offset of transmitting the group common PDCCH is S2 slots, and the transmitting period is N2, where S2 is less than or equal to N2. Then, the UE1, UE2 and UE3 learn that the transmitting slots of the group common PDCCH 1 that they need to receive are slot S1+N1, slot S1+2N1, slot S1+3N1 . . . then the terminals may try to detect the receive the group common PDCCH 1 at slot S1+N1, slot S1+2N1, slot S1+3N1; the terminal UE4 and UE5 learn that the transmitting slots of the group common PDCCH 2 that they need to receive are slot S2+N2, slot S2+2N2, slot S2+3N2 . . . then the terminals may try to detect the receive the group common PDCCH 2 at slot S2+N2, slot S2+2N2, slot S2+3N2. Assuming that the transmission offset of the group common PDCCH 1 is S1=0, the transmitting period is N, the transmission offset of the group common PDCCH is S2=1, and the transmitting period is 2N, as shown in FIG. 4

After receiving the group common PDCCH, the terminal may transmit, until the next receiving slot of the group common PDCCH, the received data according to the received group common PDCCH; or, after receiving the group common PDCCH, the terminal may transmit, until the next time receiving the group common PDCCH successfully, the received data according to the group common PDCCH received successfully; or, after receiving the group common PDCCH, the terminal may transmit, until the base station notifies to change the related parameters, the received data according to the group common PDCCH received successfully.

Further, in the case that the slot where to transmit the group common PDCCH is an uplink-only slot, the base station may transmit the group common PDCCH on the first downlink slot subsequent to the slot. The terminal learns that the slot where the transmission position of the group common PDCCH is uplink-only, and the terminal may detect and receive the group common PDCCH at the first downlink slot subsequent to the slot. For example, the base station notifies the terminal that the slot N is a uplink-only slot, and the base station may not transmit the group common PDCCH at the slot N, and the terminal may not detect the receive group common PDCCH at the slot N. Assuming that the closest slot containing the downlink resource after slot N is slot N+2, the base station may transmit the group common PDCCH at slot N+2, and the terminal may detect the receive group common PDCCH at slot N+2, as shown in FIG. 3.

According to the downlink channel transmitting method in the embodiment of the present disclosure, a transmitting period of a group common physical downlink control channel is indicated explicitly or implicitly, so that the terminal is able to determine the transmitting period of the group common physical downlink control channel explicitly or implicitly, so as to receive the group common PDCCH sent by the base station effectively, thereby improving the network performance and solving the technical issue in the related art that there is no clear solution of how to transmit group common PDCCH for scheduling or notifying a group of terminal related information which resulting in that the terminal does not know how to receive the group common PDCCH.

In some embodiments of the present disclosure, as shown in FIG. 5, a downlink channel receiving method applied to a terminal is provided, including: Step 501: determining, explicitly or implicitly, a transmitting period of a group common physical downlink control channel.

According to the downlink channel receiving method in the embodiment of the present disclosure, the terminal is able to determine the transmitting period of the group common physical downlink control channel explicitly or implicitly, so as to receive the group common PDCCH sent by the base station effectively, thereby improving the network performance and solving the technical issue in the related art that there is no clear solution of how to transmit group common PDCCH for scheduling or notifying a group of terminal related information which resulting in that the terminal does not know how to receive the group common PDCCH.

Optionally, the step 501 includes: Step 5011: determining, based on a protocol, the transmitting period of the group common physical downlink control channel.

Here, the terminal may determine the transmitting period of the group common PDCCH based on the protocol, and receive the group common PDCCH according to the transmitting period corresponding to the terminal.

Further, in order to accurately determine the receiving time slot, the method further includes: Step 5012: determining, based on the protocol, a starting time slot position of transmitting the group common physical downlink control channel.

Here, the terminal may determine the starting time slot position of transmitting the group common PDCCH based on the protocol, and further determine the receiving time slot of the group common PDCCH according to the transmitting period.

Optionally, after Step 5012, the method further includes: determining a receiving time slot of the group common physical downlink control channel, based on the transmitting period and the starting time slot position of the group common physical downlink control channel determined based on the protocol; detecting and receiving the group common physical downlink control channel on the receiving time slot.

At this time, the terminal may accurately determine the receiving time slots of the group common PDCCH according to the fixed transmitting period and the fixed starting time slot position of the group common PDCCH determined based on the protocol, and further detect and receive the group common PDCCH on the receiving time slots.

For example, in the case that the transmitting period of the group common PDCCH is N, where N is a positive integer greater than or equal to 1, and the slot number of the starting time slot position of transmitting the group common PDCCH is S, then the slot numbers of the receiving time slots of the group common PDCCH may be determined as S, S+N, S+2N, S+3N . . . in order.

According to the embodiment of the present disclosure, the base station may transmit the group common PDCCH according to the fixed transmitting period determined based on the protocol, and the terminal may effectively receive the group common PDCCH according to the fixed transmitting period determined based on the protocol, thereby improving the network performance.

Optionally, the Step 501 includes: Step 5013: determining, based on a broadcast signaling sent by a base station, a transmitting period of the group common physical downlink control channel.

Here, the terminal may determine the transmitting period of the group common PDCCH through the broadcast signaling, and receive the group common PDCCH corresponding to the terminal according to the transmitting period.

Further, in order to accurately determine the receiving time slot, the method further includes Step 5014 and/or Step 5015.

Step 5014: determining, based on a protocol, a starting time slot position of transmitting the group common physical downlink control channel.

Here, the terminal may determine the starting time slot position of transmitting the group common PDCCH based on the protocol, and further determine the receiving time slot of the group common PDCCH based on the transmitting period.

Step 5015: determining, based on the broadcast signaling sent by the base station, a starting time slot position of transmitting the group common physical downlink control channel.

Here, the terminal may determine the starting time slot position of transmitting the group common PDCCH through the broadcast signaling, and further determine the receiving time slot of the group common PDCCH based on with the transmitting period.

Optionally, after Step 5014, the method further includes: determining a receiving time slot of the group common physical downlink control channel, based on the transmitting period and the starting time slot position of the group common physical downlink control channel; detecting and receiving the group common physical downlink control channel on the receiving time slot.

At this time, the terminal may accurately determine the receiving time slot of the group common PDCCH according to the transmitting period of the group common PDCCH notified in the broadcast signaling and according to the fixed starting time slot position of the group common PDCCH determined based on the protocol, and then detect and receive the group common PDCCH on the receiving time slot.

For example, in the case that the transmitting period of the group common PDCCH is N, where N is a positive integer greater than or equal to 1, and the slot number of the starting time slot position of transmitting the group common PDCCH is S, then the slot numbers of the receiving time slots of the group common PDCCH may be determined as S, S+N, S+2N, S+3N . . . in order.

Optionally, after Step 5015, the method further includes: determining a receiving time slot of the group common physical downlink control channel, based on the transmitting period and the starting time slot position of the group common physical downlink control channel; detecting and receiving the group common physical downlink control channel on the receiving time slot.

At this time, the terminal may accurately determine the receiving time slots of the group common PDCCH according to the transmitting period and the starting time slot position of the group common PDCCH notified in the broadcast signaling, and then detect and receive the group common PDCCH on the receiving time slots.

For example, in the case that the transmitting period of the group common PDCCH is N, where N is a positive integer greater than or equal to 1, and the slot number of the starting time slot position of transmitting the group common PDCCH is C, then the slot numbers of the receiving time slots of the group common PDCCH may be determined as C, C+N, C+2N, C+3N . . . in order.

According to the embodiment of the present disclosure, the base station may notify to all terminals, through the broadcast signaling, the transmitting period of transmitting the group common PDCCH, and the terminals may receive effectively the group common PDCCH according to the transmitting period notified through the broadcast signaling, thereby improving the network performance.

Optionally, the Step 501 includes: Step 5016: determining, based on a high layer signaling sent by the base station, the transmitting period of the group common physical downlink control channel.

Here, the terminal may determine the transmitting period of the group common PDCCH based on the high layer signaling, and receive the group common PDCCH corresponding to the terminal according to the transmitting period.

Further, in order to accurately determine the receiving time slot, the method further includes Step 5017 and/or Step 5018.

Step 5017: determining, based on a protocol, a starting time slot position of transmitting the group common physical downlink control channel.

Here, the terminal may determine the starting time slot position of transmitting the group common PDCCH based on the protocol, and further determine the receiving time slot of the group common PDCCH according to the transmitting period.

Step 5018: determining, based on the high layer signaling sent by the base station, an offset of transmitting the group common physical downlink control channel.

Here, the terminal may determine the offset of transmitting the group common PDCCH through the high layer signaling, and further determine the receiving time slot of the group common PDCCH based on the transmitting period.

Optionally, after Step 5017, the method further includes: determining a receiving time slot of the group common physical downlink control channel, based on the transmitting period and the starting time slot position of the group common physical downlink control channel; detecting and receiving the group common physical downlink control channel on the receiving time slot.

At this time, the terminal may accurately determine the receiving time slots of the group common PDCCH based on the transmitting period of the group common PDCCH notified through the high layer signaling and based on the fixed starting time slot position of the group common PDCCH determined based on the protocol, and then detect and receive the group common PDCCH on the receiving time slots.

For example, in the case that the slot number of the starting time slot position of transmitting the group common PDCCH by the base station is S, the base station notifies to the UE1, through the high layer signaling, that the transmitting period of the group common PDCCH is N1 slots, and notifies to the UE2, through the high layer signaling, that the transmitting period of the group common PDCCH is N2 slots, where N1 and N2 are positive integers greater than or equal to 1, then it may be determined that the slot numbers of the transmitting time slots of the group common PDCCH of UE1 is S+N1, S+2N1, S+3N1 . . . , and the slot numbers of the transmitting time slots of the group common PDCCH is S+N2, S+2N2, S+3N2 . . . .

Optionally, after Step 5018, the method further includes: determining a receiving time slot of the group common physical downlink control channel, based on the transmitting period and the offset of the group common physical downlink control channel; detecting and receiving the group common physical downlink control channel on the receiving time slot.

At this time, the terminal may accurately determine the receiving time slots of the group common PDCCH according to the transmitting period and the offset value of the group common PDCCH notified in the high layer signaling, and then detect and receive the group common PDCCH on the receiving time slots.

For example, in the case that the base station notifies to the UE1, through the RRC signaling, that the offset of transmitting the group common PDCCH is S1, and the transmitting period is N1, where S1 is less than or equal to N1; the base station notifies to the UE2, through the RRC signaling, that the offset of transmitting the group common PDCCH is S2, and the transmitting period is N2, where S2 is less than or equal to N2; both N1 and N2 are positive integers greater than or equal to 1. Then, it may be determined that the slot numbers of the transmitting time slots of the group common PDCCH of the UE1 are slot S1+N1, S1+2N1, S1+3N1, . . . , and the slot numbers of the transmitting time slots of the group common PDCCH of the UE2 is slot S2+N2, S2+2N2, S2+3N2 . . . .

According to the embodiment of the present disclosure, the base station may notify to each terminal, through the high layer signaling, the transmitting period of transmitting the group common PDCCH, and the terminal may receive effectively the group common PDCCH according to the transmitting period notified through the high layer signaling, thereby improving the network performance.

At this time, in the case that the transmitting time slot where the base station transmits the group common PDCCH is a uplink-only time slot, the base station transmits the group common PDCCH on a downlink transmitting time slot following and closest to the transmitting time slot, thereby ensuring the smooth transmission of the group common PDCCH.

Correspondingly, the detecting and receiving the group common physical downlink control channel on the receiving time slot includes: in the case that a first receiving time slot is a uplink-only time slot, detecting and receiving the group common physical downlink control channel on a downlink receiving time slot following and closest to the first receiving time slot.

At this time, in the case that the receiving time slot of the group common PDCCH is detected to be an uplink-only time slot, the terminal detects the receives the group common PDCCH on a downlink time slot following and closest to the receiving time slot, thereby ensuring smooth reception of the group common PDCCH.

Optionally, subsequent to the determining the transmitting period of the group common physical downlink control channel, the method further includes: determining, based on the transmitting period of the group common physical downlink control channel, a data valid time of the group common physical downlink control channel.

At this time, the terminal may accurately determine the data valid time of the group common PDCCH according to the transmitting period of the group common PDCCH.

Optionally, the Step 502 includes: determining a duration of one transmitting period from a time slot where a first group common physical downlink control channel is received as the data valid time of the first group common physical downlink control channel; or determining a duration from a time slot where a first group common physical downlink control channel is received to a time point of receiving a second group common physical downlink control channel as the data valid time of the first group common physical downlink control channel; or determining a duration from a time slot where a first group common physical downlink control channel is received to a time point of receiving an instruction of changing the group common physical downlink control channel sent by the base station as the data valid time of the first group common physical downlink control channel.

At this time, the data valid time of the group common PDCCH is the transmitting period of the group common PDCCH. For example, the group common PDCCH 1 of the terminal is sent every N slots, and then the terminal may transmit the received data according to the information carried in the PDCCH 1 within the N slots including the slot where the group common PDCCH 1 is received; or, the data valid time of the group common PDCCH is a duration from a time point of receiving the group common PDCCH 1 by the terminal to a time point of receiving the next group common PDCCH by the terminal successfully, and during the data valid time, the terminal may transmit the received data according to the information carried in the PDCCH 1 received successfully; or, the data valid time of the group common PDCCH is a duration from a time point of receiving the group common PDCCH 1 by the terminal to a time point of receiving an instruction of changing the group common PDCCH sent by the base station (i.e., before the base station changes the related parameters through an explicit signaling), and during the data valid time, the terminal may transmit the received data according to the information carried in the PDCCH 1received successfully.

According to the downlink channel receiving method in the embodiment of the present disclosure, the terminal is able to determine the transmitting period of the group common physical downlink control channel explicitly or implicitly, so as to receive the group common PDCCH sent by the base station effectively, thereby improving the network performance and solving the technical issue in the related art that there is no clear solution of how to transmit group common PDCCH for scheduling or notifying a group of terminal related information which resulting in that the terminal does not know how to receive the group common PDCCH.

Figure 6:
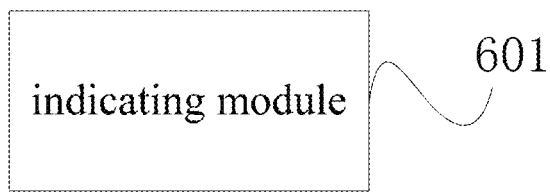
FIG. 6 is a schematic view of a downlink channel transmitting device in the present disclosure.

In some embodiments of the present disclosure, as shown in FIG. 6, a downlink channel transmitting device is further provided, including: an indicating module 601, configured to indicate, explicitly or implicitly, a transmitting period of a group common physical downlink control channel.

According to the downlink channel transmitting device in the embodiment of the present disclosure, a transmitting period of a group common physical downlink control channel is indicated explicitly or implicitly, so that the terminal is able to determine the transmitting period of the group common physical downlink control channel explicitly or implicitly, so as to receive the group common PDCCH sent by the base station effectively, thereby improving the network performance and solving the technical issue in the related art that there is no clear solution of how to transmit group common PDCCH for scheduling or notifying a group of terminal related information which resulting in that the terminal does not know how to receive the group common PDCCH.

Optionally, the indicating module 601 includes: a first determining unit, configured to determine, based on a protocol, the transmitting period of the group common physical downlink control channel.

Optionally, the device further includes: a first determining module, configured to determine, based on the protocol, a starting time slot position of transmitting the group common physical downlink control channel.

Optionally, the device further includes: a second determining module, configured to determine, in the case that the starting time slot position of transmitting the group common physical downlink control channel is determined based on the protocol, a transmitting time slot, based on the transmitting period and the starting time slot position of the group common physical downlink control channel determined based on the protocol; a transmitting module, configured to transmit the group common physical downlink control channel on the transmitting time slot.

Optionally, the indicating module 601 includes: a first notifying unit, configured to notify to all terminals within a coverage range of the base station, through a broadcast signaling, the transmitting period of the group common physical downlink control channel.

Optionally, the device further includes: a first determining module, configured to determine, based on a protocol, a starting time slot position of transmitting the group common physical downlink control channel; or a first notifying module, configured to notify to all the terminals within the coverage range of the base station, through the broadcast signaling, the starting time slot position of transmitting the group common physical downlink control channel.

Optionally, the device further includes: a third determining module, configured to determine, in the case that the starting time slot position of transmitting the group common physical downlink control channel is determined based on the protocol, or the starting time slot position of transmitting the group common physical downlink control channel is notified to all the terminals within the coverage range of the base station through the broadcast signaling, a transmitting time slot, based on the transmitting period and the starting time slot position of the group common physical downlink control channel; a transmitting module, configured to transmit the group common physical downlink control channel on the transmitting time slot.

Optionally, the indicating module 601 includes: a second notifying unit, configured to notify to a terminal, through a high layer signaling, the transmitting period of the group common physical downlink control channel corresponding to the terminal.

Optionally, the device further includes: a first determining module, configured to determine, based on a protocol, a starting time slot position of transmitting the group common physical downlink control channel; or a second notifying module, configured to notify to the terminal, through the high layer signaling, an offset of transmitting the group common physical downlink control channel corresponding to the terminal.

Optionally, the device further includes: a fourth determining module, configured to determine, in the case that the starting time slot position of transmitting the group common physical downlink control channel is determined based on the protocol, a transmitting time slot, based on the transmitting period and the starting time slot position of the group common physical downlink control channel, or configured to determine, in the case that the offset of transmitting the group common physical downlink control channel corresponding to the terminal is notified to the terminal through the high layer signaling, a transmitting time slot, based on the transmitting period and the offset of the group common physical downlink control channel; a transmitting module, configured to transmit the group common physical downlink control channel on the transmitting time slot.

Optionally, the transmitting module includes: a transmitting unit, configured to transmit, in the case that a first transmitting time slot is a uplink-only time slot, the group common physical downlink control channel on a downlink transmitting time slot following and closest to the first transmitting time slot.

According to the downlink channel transmitting device in the embodiment of the present disclosure, a transmitting period of a group common physical downlink control channel is indicated explicitly or implicitly, so that the terminal is able to determine the transmitting period of the group common physical downlink control channel explicitly or implicitly, so as to receive the group common PDCCH sent by the base station effectively, thereby improving the network performance and solving the technical issue in the related art that there is no clear solution of how to transmit group common PDCCH for scheduling or notifying a group of terminal related information which resulting in that the terminal does not know how to receive the group common PDCCH.

It should be noted that the downlink channel transmitting device is a device corresponding to the downlink channel transmitting method, and all the implementation manners in the foregoing method embodiments are applicable to the device embodiment, and the same technical effects can be achieved.

Figure 7:
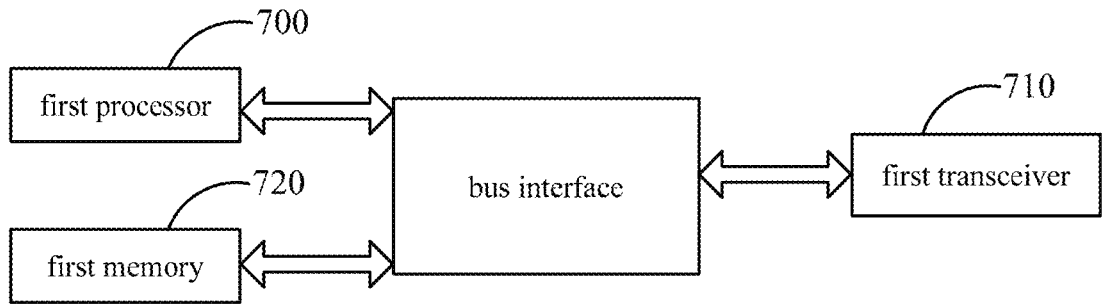
FIG. 7 is a schematic view of a base station in the present disclosure.

In some embodiments of the present disclosure, as shown in FIG. 7, a base station is further provided, including a first memory 720, a first processor 700, a first transceiver 710, a bus interface and a computer program stored in the first memory 720 and executable by the first processor 700, the first processor 700 is configured to read a program stored in the first memory 720 to: indicate, explicitly or implicitly, a transmitting period of a group common physical downlink control channel.

In FIG. 7, the bus architecture may include any number of interconnected buses and bridges, specifically linked by one or more processors represented by the first processor 700 and various circuits of the memory represented by the first memory 720. The bus architecture can also link various other circuits such as peripherals, voltage regulators, and power management circuits, which are well known in the art and, therefore, will not be further described herein. The bus interface provides an interface. The first transceiver 710 can be a plurality of components, including a transmitter and a transceiver, providing means for communicating with various other devices on a transmission medium. The first processor 700 is responsible for managing the bus architecture and the usual processing, and the first memory 720 can store data used by the first processor 700 when performing operations.

The first processor 700 is further configured to determine, based on a protocol, the transmitting period of the group common physical downlink control channel.

The first processor 700 is further configured to determine, based on the protocol, a starting time slot position of transmitting the group common physical downlink control channel.

The first processor 700 is further configured to determine, in the case that the starting time slot position of transmitting the group common physical downlink control channel is determined based on the protocol, a transmitting time slot, based on the transmitting period and the starting time slot position of the group common physical downlink control channel determined based on the protocol; and transmit the group common physical downlink control channel on the transmitting time slot.

The first processor 700 is further configured to notify to all terminals within a coverage range of the base station, through a broadcast signaling, the transmitting period of the group common physical downlink control channel.

The first processor 700 is further configured to determine, based on a protocol, a starting time slot position of transmitting the group common physical downlink control channel; or notify to all the terminals within the coverage range of the base station, through the broadcast signaling, the starting time slot position of transmitting the group common physical downlink control channel.

The first processor 700 is further configured to determine, in the case that the starting time slot position of transmitting the group common physical downlink control channel is determined based on the protocol, or the starting time slot position of transmitting the group common physical downlink control channel is notified to all the terminals within the coverage range of the base station through the broadcast signaling, a transmitting time slot, based on the transmitting period and the starting time slot position of the group common physical downlink control channel; transmit the group common physical downlink control channel on the transmitting time slot.

The first processor 700 is further configured to notify to a terminal, through a high layer signaling, the transmitting period of the group common physical downlink control channel corresponding to the terminal.

The first processor 700 is further configured to determine, based on a protocol, a starting time slot position of transmitting the group common physical downlink control channel; or notify to the terminal, through the high layer signaling, an offset of transmitting the group common physical downlink control channel corresponding to the terminal.

The first processor 700 is further configured to determine, in the case that the starting time slot position of transmitting the group common physical downlink control channel is determined based on the protocol, a transmitting time slot, based on the transmitting period and the starting time slot position of the group common physical downlink control channel, or configured to determine, in the case that the offset of transmitting the group common physical downlink control channel corresponding to the terminal is notified to the terminal through the high layer signaling, a transmitting time slot, based on the transmitting period and the offset of the group common physical downlink control channel; transmit the group common physical downlink control channel on the transmitting time slot.

The first processor 700 is further configured to transmit, in the case that a first transmitting time slot is a uplink-only time slot, the group common physical downlink control channel on a downlink transmitting time slot following and closest to the first transmitting time slot.

A non-transitory computer-readable storage medium is further provided in some embodiments of the present disclosure, including: programs and instructions stored in the non-transitory computer-readable memory, where a computer processor executes the programs and instructions to indicate, explicitly or implicitly, a transmitting period of a group common physical downlink control channel.

Figure 8:
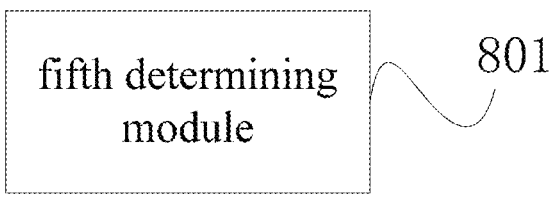
FIG. 8 is a schematic view of a downlink channel receiving device in the present disclosure.

In some embodiments of the present disclosure, as shown in FIG. 8, a downlink channel receiving device applied to a terminal is also provided, including: a fifth determining module 801, configured to determine, explicitly or implicitly, a transmitting period of a group common physical downlink control channel.

According to the downlink channel receiving device in the embodiment of the present disclosure, the terminal is able to determine the transmitting period of the group common physical downlink control channel explicitly or implicitly, so as to receive the group common PDCCH sent by the base station effectively, thereby improving the network performance and solving the technical issue in the related art that there is no clear solution of how to transmit group common PDCCH for scheduling or notifying a group of terminal related information which resulting in that the terminal does not know how to receive the group common PDCCH.

Optionally, the fifth determining module 801 includes: a second determining unit, configured to determine, based on a protocol, the transmitting period of the group common physical downlink control channel.

Optionally, the device further includes: a sixth determining module, configured to determine, based on the protocol, a starting time slot position of transmitting the group common physical downlink control channel.

Optionally, the device further includes: a seventh determining module, configured to determine, in the case that the starting time slot position of transmitting the group common physical downlink control channel is determined based on the protocol, a receiving time slot of the group common physical downlink control channel, based on the transmitting period and the starting time slot position of the group common physical downlink control channel determined based on the protocol; a receiving module, configured to detect and receive the group common physical downlink control channel on the receiving time slot.

Optionally, the fifth determining module 801 includes: a third determining unit, configured to determine, based on a broadcast signaling sent by a base station, a transmitting period of the group common physical downlink control channel.

Optionally, the device further includes: a six determining unit, configured to determine, based on a protocol, a starting time slot position of transmitting the group common physical downlink control channel; or an eighth determining unit, configured to determine, based on the broadcast signaling sent by the base station, a starting time slot position of transmitting the group common physical downlink control channel.

Optionally, the device further includes: a ninth determining unit, configured to determine, in the case that the starting time slot position of transmitting the group common physical downlink control channel is determined based on the protocol, or the starting time slot position of transmitting the group common physical downlink control channel is determined based on the broadcast signaling sent by the base station, a receiving time slot of the group common physical downlink control channel, based on the transmitting period and the starting time slot position of the group common physical downlink control channel; a receiving module, configured to detect and receive the group common physical downlink control channel on the receiving time slot.

Optionally, the fifth determining module 801 includes: a fourth determining unit, configured to determine, based on a high layer signaling sent by the base station, the transmitting period of the group common physical downlink control channel.

Optionally, the device further includes: a sixth determining unit, configured to determine, based on a protocol, a starting time slot position of transmitting the group common physical downlink control channel; or a tenth determining unit, configured to determine, based on the high layer signaling sent by the base station, an offset of transmitting the group common physical downlink control channel.

Optionally, the device further includes: an eleventh determining module, configured to determine, in the case that the starting time slot position of transmitting the group common physical downlink control channel is determined based on the protocol, a receiving time slot of the group common physical downlink control channel, based on the transmitting period and the starting time slot position of the group common physical downlink control channel, or determine, in the case that the offset of transmitting the group common physical downlink control channel is determined based on the high layer signaling sent by the base station, a receiving time slot of the group common physical downlink control channel, based on the transmitting period and the offset of the group common physical downlink control channel; a receiving module, configured to detect and receive the group common physical downlink control channel on the receiving time slot.

Optionally, the receiving module includes: a receiving unit, configured to detect and receive, in the case that a first receiving time slot is a uplink-only time slot, subsequent to the first receiving time slot, the group common physical downlink control channel on a downlink receiving time slot following and closest to the first receiving time slot.

Optionally, the device further includes: a twelfth determining module, configured to determine, in the case that the transmitting period of the group common physical downlink control channel is determined, a data valid time of the group common physical downlink control channel based on the transmitting period of the group common physical downlink control channel.

Optionally, the twelfth determining module is configured to: determine the duration of one transmitting period from a time slot where a first group common physical downlink control channel is received as the data valid time of the first group common physical downlink control channel; or determine the duration from a time slot where a first group common physical downlink control channel is received to a time point of receiving a second group common physical downlink control channel as the data valid time of the first group common physical downlink control channel; or determine the duration from a time slot where a first group common physical downlink control channel is received to a time point of receiving an instruction of changing the group common physical downlink control channel sent by the base station as the data valid time of the first group common physical downlink control channel.

According to the downlink channel receiving device in the embodiment of the present disclosure, the terminal is able to determine the transmitting period of the group common physical downlink control channel explicitly or implicitly, so as to receive the group common PDCCH sent by the base station effectively, thereby improving the network performance and solving the technical issue in the related art that there is no clear solution of how to transmit group common PDCCH for scheduling or notifying a group of terminal related information which resulting in that the terminal does not know how to receive the group common PDCCH.

It should be noted that the downlink channel receiving device is a device corresponding to the downlink channel receiving method, and all the implementation manners in the foregoing method embodiments are applicable to the device embodiment, and the same technical effects can be achieved.

Figure 9:
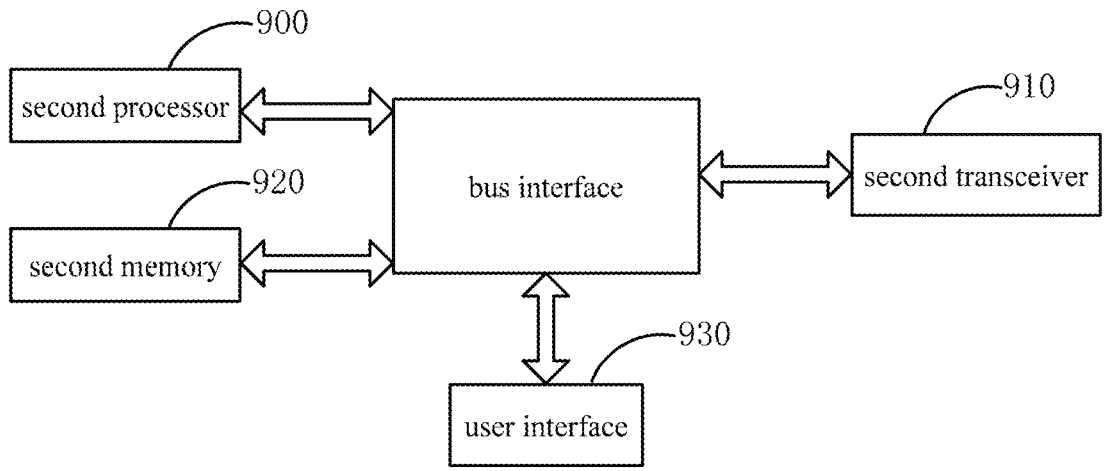
FIG. 9 is a schematic view of a terminal in the present disclosure.

In some embodiments of the present disclosure, as shown in FIG. 9, a terminal is further provided, including a second memory 920, a second processor 900, a second transceiver 910, a user interface 930, a bus interface and a computer program on the second memory 920 and executable on the second processor 900, the second processor 900 is configured to read a program in the second memory 920 to determine, explicitly or implicitly, a transmitting period of a group common physical downlink control channel.

In FIG. 9, the bus architecture may include any number of interconnected buses and bridges, specifically linked by one or more processors represented by the second processor 900 and various circuits of the memory represented by the second memory 920. The bus architecture can also link various other circuits such as peripherals, voltage regulators, and power management circuits, which are well known in the art and, therefore, will not be further described herein. The bus interface provides an interface. The second transceiver 910 may be a plurality of components, including a transmitter and a transceiver, providing means for communicating with various other devices on a transmission medium. For different user equipments, the user interface 930 may also be an interface capable of externally connecting the required devices, including but not limited to a keypad, a display, a speaker, a microphone, a joystick, and the like.

The second processor 900 is responsible for managing the bus architecture and general processing, and the second memory 920 can store data used by the second processor 900 when performing operations.

The second processor 900 is further configured to determine, based on a protocol, the transmitting period of the group common physical downlink control channel.

The second processor 900 is further configured to determine, based on the protocol, a starting time slot position of transmitting the group common physical downlink control channel.

The second processor 900 is further configured to determine, in the case that the starting time slot position of transmitting the group common physical downlink control channel is determined based on the protocol, a receiving time slot of the group common physical downlink control channel, based on the transmitting period and the starting time slot position of the group common physical downlink control channel determined based on the protocol; detect and receive the group common physical downlink control channel on the receiving time slot.

The second processor 900 is further configured to determine, based on a broadcast signaling sent by a base station, a transmitting period of the group common physical downlink control channel.

The second processor 900 is further configured to determine, based on a protocol, a starting time slot position of transmitting the group common physical downlink control channel; or determine, based on the broadcast signaling sent by the base station, a starting time slot position of transmitting the group common physical downlink control channel.

The second processor 900 is further configured to determine, in the case that the starting time slot position of transmitting the group common physical downlink control channel is determined based on the protocol, or the starting time slot position of transmitting the group common physical downlink control channel is determined based on the broadcast signaling sent by the base station, a receiving time slot of the group common physical downlink control channel, based on the transmitting period and the starting time slot position of the group common physical downlink control channel; detect and receive the group common physical downlink control channel on the receiving time slot.

The second processor 900 is further configured to determine, based on a high layer signaling sent by the base station, the transmitting period of the group common physical downlink control channel.

The second processor 900 is further configured to determine, based on a protocol, a starting time slot position of transmitting the group common physical downlink control channel; or determine, based on the high layer signaling sent by the base station, an offset of transmitting the group common physical downlink control channel.

The second processor 900 is further configured to determine, in the case that the starting time slot position of transmitting the group common physical downlink control channel is determined based on the protocol, a receiving time slot of the group common physical downlink control channel, based on the transmitting period and the starting time slot position of the group common physical downlink control channel, or determine, in the case that the offset of transmitting the group common physical downlink control channel is determined based on the high layer signaling sent by the base station, a receiving time slot of the group common physical downlink control channel, based on the transmitting period and the offset of the group common physical downlink control channel; detect and receive the group common physical downlink control channel on the receiving time slot.

The second processor 900 is further configured to detect and receive, in the case that a first receiving time slot is a uplink-only time slot, subsequent to the first receiving time slot, the group common physical downlink control channel on a downlink receiving time slot following and closest to the first receiving time slot.

The second processor 900 is further configured to determine, in the case that the transmitting period of the group common physical downlink control channel is determined, a data valid time of the group common physical downlink control channel based on the transmitting period of the group common physical downlink control channel.

The second processor 900 is further configured to: determine the duration of one transmitting period from a time slot where a first group common physical downlink control channel is received as the data valid time of the first group common physical downlink control channel; or determine the duration from a time slot where a first group common physical downlink control channel is received to a time point of receiving a second group common physical downlink control channel as the data valid time of the first group common physical downlink control channel; or determine the duration from a time slot where a first group common physical downlink control channel is received to a time point of receiving an instruction of changing the group common physical downlink control channel sent by the base station as the data valid time of the first group common physical downlink control channel.

A non-transitory computer-readable storage medium is further provided some embodiments of the present disclosure, including: programs and instructions stored in the non-transitory computer-readable memory, where a computer processor executes the programs and instructions to perform the downlink channel transmitting method hereinabove.

In the embodiments of the present disclosure, it should be understood that the size of the serial numbers of the above processes does not mean the order of execution, and the order of execution of each process should be determined by its function and internal logic, and should not limit the embodiments of the present disclosure.

The above some embodiments of the present disclosure, and it should be noted that those skilled in the art may also make several improvements and modifications without departing from the principles of the present disclosure which also fall within the scope of the present disclosure.

What is claimed is:
1. A downlink channel transmitting method applied to a base station, comprising:
   indicating, explicitly or implicitly, a transmitting period of a group common physical downlink control channel;
   wherein the indicating explicitly the transmitting period of the group common physical downlink control channel comprises:

notifying to a terminal, through a high layer signaling, the transmitting period of the group common physical downlink control channel corresponding to the terminal;

wherein the method further comprises:

determining, based on a protocol, a starting time slot position of transmitting the group common physical downlink control channel; or notifying to the terminal, through the high layer signaling, an offset of transmitting the group common physical downlink control channel corresponding to the terminal;

wherein subsequent to the determining, based on the protocol, the starting time slot position of transmitting the group common physical downlink control channel, the method further comprises:

determining a transmitting time slot, based on the transmitting period and the starting time slot position of the group common physical downlink control channel;

transmitting the group common physical downlink control channel on the transmitting time slot;

or subsequent to the notifying to the terminal, through the high layer signaling, the offset of transmitting the group common physical downlink control channel corresponding to the terminal, the method further comprises:

determining a transmitting time slot, based on the transmitting period and the offset of the group common physical downlink control channel;

transmitting the group common physical downlink control channel on the transmitting time slot.

2. The method according to claim 1, wherein the indicating implicitly the transmitting period of the group common physical downlink control channel comprises:

determining, based on a protocol, the transmitting period of the group common physical downlink control channel.

3. The method according to claim 2, further comprising:

determining, based on the protocol, a starting time slot position of transmitting the group common physical downlink control channel;

wherein subsequent to the determining, based on the protocol, the starting time slot position of transmitting the group common physical downlink control channel, the method further comprises:

determining a transmitting time slot, based on the transmitting period and the starting time slot position of the group common physical downlink control channel determined based on the protocol;

transmitting the group common physical downlink control channel on the transmitting time slot.

4. The method according to claim 1, wherein the indicating explicitly the transmitting period of the group common physical downlink control channel comprises:

notifying to all terminals within a coverage range of the base station, through a broadcast signaling, the transmitting period of the group common physical downlink control channel.

5. The method according to claim 4, further comprising:

determining, based on a protocol, a starting time slot position of transmitting the group common physical downlink control channel; or notifying to all the terminals within the coverage range of the base station, through the broadcast signaling, the starting time slot position of transmitting the group common physical downlink control channel;

wherein subsequent to the determining, based on the protocol, the starting time slot position of transmitting the group common physical downlink control channel, or notifying to all the terminals within the coverage range of the base station, through the broadcast signaling, the starting time slot position of transmitting the group common physical downlink control channel, the method further comprises:

determining a transmitting time slot, based on the transmitting period and the starting time slot position of the group common physical downlink control channel;

transmitting the group common physical downlink control channel on the transmitting time slot.

6. A downlink channel transmitting device applied to a base station, comprising: a first memory, a first processor and a computer program stored in the first memory and executable by the first processor, wherein the first processor executes the computer program to perform the downlink channel transmitting method according to claim 1.

7. A base station, comprising: a first memory, a first processor and a computer program stored in the first memory and executable by the first processor, wherein the first processor executes the computer program to perform the downlink channel transmitting method according to claim 1.

8. A downlink channel receiving method applied to a terminal, comprising:

determining, explicitly or implicitly, a transmitting period of a group common physical downlink control channel;

wherein the determining explicitly the transmitting period of the group common physical downlink control channel comprises:

determining, based on a high layer signaling sent by the base station, the transmitting period of the group common physical downlink control channel;

wherein the method further comprises:

determining, based on a protocol, a starting time slot position of transmitting the group common physical downlink control channel; or determining, based on the high layer signaling sent by the base station, an offset of transmitting the group common physical downlink control channel;

wherein subsequent to the determining, based on the protocol, the starting time slot position of transmitting the group common physical downlink control channel, the method further comprises:

determining a receiving time slot of the group common physical downlink control channel, based on the transmitting period and the starting time slot position of the group common physical downlink control channel;

detecting and receiving the group common physical downlink control channel on the receiving time slot;

or subsequent to the determining, based on the high layer signaling sent by the base station, the offset of transmitting the group common physical downlink control channel, the method further comprises:

determining a receiving time slot of the group common physical downlink control channel, based on the transmitting period and the offset of the group common physical downlink control channel;

detecting and receiving the group common physical downlink control channel on the receiving time slot.

9. The method according to claim 8, wherein the determining implicitly the transmitting period of the group common physical downlink control channel comprises:

determining, based on a protocol, the transmitting period of the group common physical downlink control channel.

10. The method according to claim 9, further comprising:
determining, based on the protocol, a starting time slot position of transmitting the group common physical downlink control channel;
wherein subsequent to the determining, based on the protocol, the starting time slot position of transmitting the group common physical downlink control channel, the method further comprises:
determining a receiving time slot of the group common physical downlink control channel, based on the transmitting period and the starting time slot position of the group common physical downlink control channel determined based on the protocol;
detecting and receiving the group common physical downlink control channel on the receiving time slot.

11. The method according to claim 8, wherein the determining explicitly the transmitting period of the group common physical downlink control channel comprises:
determining, based on a broadcast signaling sent by a base station, a transmitting period of the group common physical downlink control channel.

12. The method according to claim 11, further comprising:
determining, based on a protocol, a starting time slot position of transmitting the group common physical downlink control channel; or
determining, based on the broadcast signaling sent by the base station, a starting time slot position of transmitting the group common physical downlink control channel;
wherein subsequent to the determining, based on the protocol, the starting time slot position of transmitting the group common physical downlink control channel or determining, based on the broadcast signaling sent by the base station, the starting time slot position of transmitting the group common physical downlink control channel, the method further comprises:
determining a receiving time slot of the group common physical downlink control channel, based on the transmitting period and the starting time slot position of the group common physical downlink control channel;
detecting and receiving the group common physical downlink control channel on the receiving time slot.

13. The method according to claim 8, wherein subsequent to the determining the transmitting period of the group common physical downlink control channel, the method further comprises:
determining, based on the transmitting period of the group common physical downlink control channel, a data valid time of the group common physical downlink control channel.

14. The method according to claim 13, wherein the determining, based on the transmitting period of the group common physical downlink control channel, the data valid time of the group common physical downlink control channel comprises:
determining the duration of one transmitting period from a time slot where a first group common physical downlink control channel is received as the data valid time of the first group common physical downlink control channel; or
determining the duration from a time slot where a first group common physical downlink control channel is received to a time point of receiving a second group common physical downlink control channel as the data valid time of the first group common physical downlink control channel; or
determining the duration from a time slot where a first group common physical downlink control channel is received to a time point of receiving an instruction of changing the group common physical downlink control channel sent by the base station as the data valid time of the first group common physical downlink control channel.

15. A downlink channel receiving device applied to a terminal, comprising: a second memory, a second processor and a computer program stored in the second memory and executable by the second processor, wherein the second processor executes the computer program to perform the downlink channel receiving method according to claim 8.

16. A terminal, comprising: a second memory, a second processor and a computer program stored in the second memory and executable by the second processor, wherein the second processor executes the computer program to perform the downlink channel receiving method according to claim 8.

* * * * *